United States Patent [19]

Righele et al.

[11] Patent Number: 4,797,973
[45] Date of Patent: Jan. 17, 1989

[54] BAGGING AND APPORTIONING MACHINE FOR SAUSAGES AND VARIOUS BAGGED PRODUCTS

[75] Inventors: Giovanni B. Righele, Zane; Giuseppe Scorzato, Marano Vicentino, both of Italy

[73] Assignee: Risco Brevetti S.p.A., Italy

[21] Appl. No.: 38,769

[22] Filed: Apr. 15, 1987

[30] Foreign Application Priority Data

May 12, 1986 [IT] Italy ................. 20403 A/86

[51] Int. Cl.⁴ ............................................ A22C 11/04
[52] U.S. Cl. ...................................................... 17/33
[58] Field of Search .................. 17/39, 41, 42, 36, 49, 17/33, 34, 35; 141/313; 53/122, 517

[56] References Cited

U.S. PATENT DOCUMENTS 3,703,064 11/1972 Lugiewicz ........................ 53/122
4,451,954 6/1984 Müller ................................. 17/39

Primary Examiner—Willie G. Abercrombie
Attorney, Agent, or Firm—Steele, Gould & Fried

[57] ABSTRACT

The machine comprises a device for feeding the product to be bagged under constant pressure toward an outlet orifice, a filling spout and a cutoff valve placed between said outlet orifice and said filling spout. The cutoff valve is periodically moved to the open position for adjustable predetermined time periods corresponding to adjustable amounts of the product delivered.

4 Claims, 1 Drawing Sheet

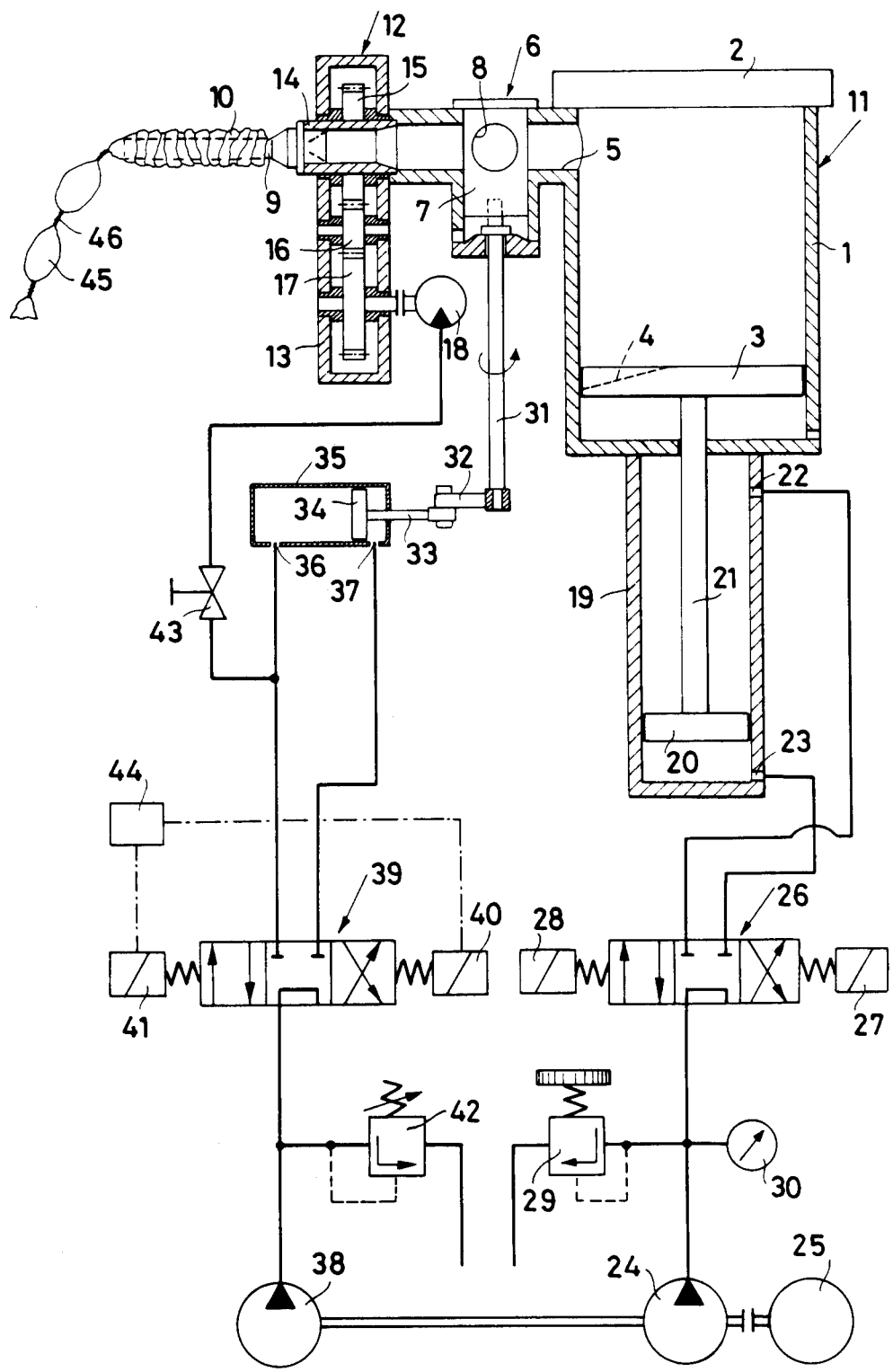

BAGGING AND APPORTIONING MACHINE FOR SAUSAGES AND VARIOUS BAGGED PRODUCTS

The present invention relates to a bagging and apportioning machine for sausage and other bagged products.

Piston or continuous vacuum bagging machines of various kinds are known in which the product to be bagged (ground meat) is input and made to advance by a special pushing member such as a piston, blades or other.

Each advance of the pushing member causes the delivery of an amount of product through an outlet orifice to a filling tube on which is fitted a pleated flexible tube designed to form the casing of the bagged product.

If desired the casing can be made to rotate at each pause between one pumpful and the next to bring about twisting of the casing between one feeding and the next and hence separation of the bagged product into individual pieces which follow each other in a chain.

A cutoff valve is sometimes associated with said orifice to prevent the compressible product from continuing to issue after each pumpful until it reaches natural pressure.

In modern bagging machines, especially for the production of frankfurters, the employment of an apportioner is required to permit obtaining programmed and adjustable amounts of the product at each pumpful of the bagging machine.

For this purpose the various builders have developed rather complicated and sophisticated systems. This is the case for example of the machine described in international patent application No. WO 81/03259, (U.S. Pat No. 4,451,954).

The object of the present invention is to accomplish a bagging machine which would provide a simple but effective system of apportioning the delivered product.

In accordance with the invention said object is achieved by a bagging and apportioning machine comprising a container for a mass of product to be bagged, a pushing member included in said container to push the product toward an outlet orifice associated with said container, a filling spout communicating with said orifice and a cutoff valve placed between said orifice and said filling spout characterized in that it comprises means for causing said pushing member to push the product at constant pressure toward said output orifice and means for causing alternate movements of said cutoff valve between the open and closed positions at predetermined adjustable intervals.

In other words the machine in accordance with the invention apportions the product by utilizing constant pressure imparted by the pushing member to the product to be bagged and appropriate selection of opening and closing intervals of the cutoff valve.

In this manner at each preselected interval there corresponds a very precise amount of product fed under constant pressure. By increasing the open time of the cutoff valve the amount of the fed portion is increased correspondingly. By decreasing said open time the amount of the corresponding portion is decreased.

An example of a practical embodiment of the machine in accordance with the invention is shown for greater clarity in the annexed drawing the only figure of which illustrates the basic parts of the machine in combination with the related hydraulic control circuit in the example setting forth the hypothetical employment of a piston feeder.

The numerical reference 11 in the drawing indicates a piston feed device which comprises a cylindrical container 1 with a cover 2 in which is housed in a sliding manner a feed piston 3 equipped in a known manner with a chute 4 to facilitate delivery of the product when the piston is at the end of its lifting travel.

Near its open end the container 1 has an output orifice 5 with which is associated a cutoff valve 6 consisting of a rotating shutter 7 pierced by a round hole 8.

Depending on the angular position of the shutter 7 the cutoff valve 6 opens and closes communication between the output orifice 5 and a filling spout 9 on which is fitted a pleated flexible casing 10 designed to receive successive portions of the product to be bagged.

With the filling spout 9 there is associated a twister 12 made up basically of a fixed envelope 13, a turning sleeve 14 which supports the tube 9 and communicates or not with the orifice 5 depending on the position of the cutoff valve 6, and an assembly of cooperating gears 15, 16 and 17 driven by a hydraulic motor 18.

Movement of the piston 3 is provided by a hydraulic control cylinder 19 inside which slides a drive piston 20 connected to the feed piston 3 by a stem 21. Two end orifices 22 and 23 of the internal chamber of the cylinder 19 can be closed alternatively as in the case illustrated in the drawing or connected to the delivery side of a pump 24 driven by a motor 25 and to a discharge or connected to the discharge and delivery side respectively of the pump 24 depending on the position of a solenoid valve 26 equipped with control coils 27 and 28. A pressure regulator 29 and a pressure gauge 30 are also associated with the delivery side of the pump 24 to permit adjustment of the pressure of the fluid (oil or air) fed alternatively to the upper and lower chambers of the hydraulic cylinder 19.

The shutter 7 of the cutoff valve 6 is rotated by a drive shaft 31 connected through a lever 32 to the stem 33 of a piston 34 sliding in a hydraulic cylinder 35. Two end orifices 36 and 37 of the internal chamber of the cylinder 35 can be closed alternatively as in the case illustrated in the drawing or connected to the delivery side of a pump 38 also driven by the motor 25 and to a discharge or to the discharge and the delivery side respectively of the pump 38 depending on the position of the solenoid valve 39 equipped with control coils 40 and 41 controlled by an adjustable timer 44. A pressure regulator 42 is also associated with the delivery side of the pump 38.

Finally, the hydraulic motor 18 is fed in the same manner as the end orifice 36 of the hydraulic cylinder 35 through a valve 43.

Start of the working cycle calls first for filling the container 1 with a mass of product to be bagged and fitting of the casing 10 on the filling spout 9. The coil 28 then moves the solenoid valve 26 to a position such as to let fluid under pressure into the inner chamber of the hydraulic cylinder beneath the control piston 20. The solenoid valve 26 is then held in said position so as to assure constant pressure under the piston 20 and hence a corresponding constant pressure applied by the feed piston 3 to the product loaded in the container 1.

Simultaneously the timer 44 excites the coils 40 and 41 in appropriate alternation accompanied by corresponding alternative movements of the solenoid valve 39 to the positions which permit feeling of fluid under pressure and of the drive piston 34 respectively. Consequently the shutter 7 of the cutoff valve 6 turns from the closed position illustrated in the drawing to the open position, rotated 90°, which aligns the hole 8 with the output orifice 5 of the container 1.

With the cutoff valve 6 in the open position an amount of product is pushed under constant pressure by the feed piston 3 to the filling spout 9 and then into the casing 10. The quantity of product is determined by the open time of the valve 6, which is determined in an adjustable manner by the timer 44.

During each closed period of the valve 6 fluid under pressure is also fed to the hydraulic motor 18 which through the gears 17, 16 and 15 of the twister 12 rotates the filling spout 9 to provide twisting of the casing 10 between one amount and the next of the delivered product. In this manner there is formed a chain of individual bagged products 45 separated by short peduncles 46.

If desired it is possible to disactivate the twister 12 by closing the valve 43.

Alternatively in place of the piston feed 1, 3 it is possible to employ a continuous filling pump.

We claim:

1. Bagging and apportioning machine for sausages and various bagged products comprising a container for a mass of product to be bagged, a pushing member included in said container to push the product toward an outlet orifice associated with said container, a filling spout communicating with said orifice and cutoff valve placed between said orifice and said filling spout characterized in that it comprises means for driving said pushing member to push the product continuously under constant pressure towards said output orifice and maintaining a constant pressure on said product, and means to alternately move said cutoff valve to an open and a closed position in accordance with predetermined adjustable timed intervals.

2. Machine in accordance with claim 1 characterized in that said pushing member consists of a feed piston sliding in said container and said means to drive said feed piston include a drive piston controlled with fluid under constant pressure fed through a solenoid valve.

3. Machine in accordance with claim 1 characterized in that said means for driving said cutoff valve include a drive member controlled by fluid fed through a solenoid valve driven intermittently under control of an adjustable timer means for generating said predetermined timed intervals.

4. Machine in accordance with claim 1 characterized in that said pushing member and said container are part of a continuous filling pump.

* * * * *